3,772,228
PROCESS FOR PREPARING POLYEPOXIDE
DISPERSION COATING COMPOSITIONS
Roy A. Allen, Laurel Springs, N.J., assignor to Shell Oil
Company, New York, N.Y.
No Drawing. Continuation-in-part of abandoned application Ser. No. 732,860, May 29, 1968. This application Jan. 7, 1971, Ser. No. 104,780
Int. Cl. C09d 3/52, 3/58, 5/26
U.S. Cl. 260—21
20 Claims

ABSTRACT OF THE DISCLOSURE

A one-package, thermoset coating composition that can be applied by conventional liquid application techniques is prepared by grinding and dispersing (1) a solid, friable polyepoxide, (2) a solid, friable epoxy curing agent, preferably polycarboxylic acid anhydrides such as benzophenone tetracarboxylic dianhydride and, optionally (3) an epoxy curing accelerator (stannous octoate), in a liquid which is a non-solvent for the components (aliphatic hydrocarbons).

BACKGROUND OF THE INVENTION

This application is a continuation-in-part application of Ser. No. 732,860, filed May 29, 1968, now abandoned.

Dispersion coating systems are generally well known and include the vinyl (polyvinyl chloride) plastisols and organosols as well as polyethylene and polypropylene dispersion coatings. All of these existing dispersion coating systems depend on fusion alone for film formation and as such are thermoplastic in nature.

Conventional solutions of thermosetting resins such as epoxy resins are based upon the use of liquids which are solvents for the resins such as the aromatic solvents. These solvents, for the most part, are expensive and present a distinct health hazard.

It is also known to prepare liquid dispersions of epoxy resins and liquid curing agents such as liquid amines wherein the curing agents polymerize the discrete particles of the epoxy resin to an infusible state thus producing a granular product when the liquid media is removed (see U.S. 3,420,791). In other words, such processes are directed to the preparation of granular or powdered solid products having a discrete particle size for use as pigments and fillers and not to the preparation of liquid dispersions which are applied by conventional liquid application techniques to form smooth, adherent, highly cross-linked films on baking.

Very good thermoset surface coatings can be obtained by the use of the so-called fluidized bed epoxy compositions such as those disclosed in U.S. Pats. 3,344,096, 3,336,251, and 3,362,922. While these epoxy compositions offer excellent coatings having improved and desirable properties when applied by fluidized bed techniques, there are many applications where it would not be feasible nor economical to use a fluidized bed powder system. It will be appreciated, however, that it is very desirable to obtain a surface coating that possess all the desirable physical properties of the fluidized bed coatings yet can be applied as a stable, one-package, liquid system by conventional techniques.

Such a one-package, thermoset composition has now been discovered which not only produces cured coatings which have improved resistance to chemicals, particularly acids, improved flexibility, improved impact resistance and superior electrical properties, but also can be applied by techniques employed when using conventional solvent-based epoxy systems.

SUMMARY OF THE INVENTION

The present invention is directed to a method for preparing a one-package, thermoset epoxy coating composition that can be applied by conventional liquid application techniques which comprises grinding and dispersing (1) a friable polyepoxide having at least one vicinal epoxy group, (2) a friable polyepoxide curing agent such as trimelletic anhydride, phenolic resins, aminoplasts, benzophenone tetracarboxylic dianhydrides, etc., and optionally (3) an epoxy curing accelerator such as triphenyl phosphine or stannous octoate in a liquid medium which is a non-solvent for the components such as the aliphatic hydrocarbons or in some applications, water.

Preferred curing agents include the solid, friable polycarboxylic acids and anhydrides such as the benzophenone tetracarboxylic dianhydrides, trimellitic anhydride, pyromellitic anhydride, etc.

There are many advantages offered by the instant compositions, such as: (1) rapid solvent release, (2) higher application solids (viscosity of 100 cp. at 50% nonvolatiles), (3) economic advantage of lower-cost aliphatic thinner, (4) the exempt classification of this type of thinner, (5) improved chemical resistance, particularly with respect to acids, of the cured coatings, (6) superior electrical properties of the cured coatings.

A very special advantage of the present dispersion system is that the solid, friable reactants (thermoset resin and curing agent) are combined in a non-solvent wherein there is no co-reaction until applied, the "solvent" evaporated, and the co-reactants intimately combined (cured) at the fusing/curing temperature. In this way, a stable, one-package system is obtained which can be easily and economically utilized by conventional liquid techniques.

The present compositions also make it possible to use acid anhydrides and other comparable curing agents not presently usable in conventionally applied solvent-based epoxy systems.

The present compositions further utilize low cost solvents which are exempt from the restrictions imposed by governmental bodies relevant to air polution (Rule 66). They thus provide greater latitude in the production of coated articles without serious contribution to atmospheric pollution, since only exempt solvents are used.

Although the instant process is described with particular reference to epoxy coating systems, it will be appreciated that the present process is equally suitable for use with any solid, friable thermosetting resin/curing agent system such as the phenolic resins, urea-formaldehyde resins, melamineformaldehyde resins etc.

DESCRIPTION OF THE PREFERRED EMBODIMENT

The present invention is particularly directed to a method for the preparation of a one-package, epoxy coating composition that can be applied by conventional liquid application techniques such as dipping, spraying, painting and the like, which comprises grinding (1) a solid, i.e., friable, polyepoxide having at least one vic-epoxy group per molecule and preferably a glycidyl polyether of a polyhydric phenol or polyhydric alcohol, (2) a solid, i.e., friable, epoxy curing agent such as trimellitic anhydride or benzophenone tetracarboxylic anhydride, (3) and optionally, an epoxy curing accelerator such as stannous octoate or triphenyl phosphine in a liquid non-solvent such as aliphatic hydrocarbons. The grinding is preferably done in a pebble mill containing high density grinding media, preferably cylindrical high density media.

A very suitable grinding method and media are described in U.S. 3,362,922.

The polyepoxide materials used in preparing the compositions of the present invention comprise those solid organic materials which have more than one vic-epoxy group, i.e., more than one

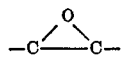

group, which group may be in a terminal position, i.e., a

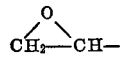

group, or in an internal position, i.e., a

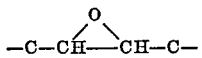

The polyepoxides must be solid or friable materials and may be saturated or unsaturated, aliphatic, cycloaliphatic, aromatic or heterocyclic and may be substituted with substituents, such as chloride, hydroxyl groups, ether radicals, and the like.

Examples include the solid epoxy polyethers of polyhydric phenols prepared by reacting a polyhydric phenol such as bisphenol A with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2′-bis(4-hydroxyphenyl)propane (bisphenol A), 2,2-bis(4-hydroxyphenol)butane, 4,4′-dihydroxybenzophenone, bis (4 - hydroxyphenyl)ethane, 2,2 - bis(4-hydroxyphenyl)-butane, 4,4′-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3 - bromo-1,2-epoxyhexane, 3-chloro-1,2-epoxyhexane, 3-chloro-1,2-epoxyoctane, and the like. By varying the ratios of the phenol and epichlorohydrin one obtains different molecular weight products as shown in U.S. Pat. 2,633,458.

A preferred group of the above-described epoxy polyethers of polyhydric phenols are the solid glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of suitable solid glycidyl polyethers of dihydric phenols is illustrated in U.S. Pat. 2,633,458 and are designated polyethers B, C and D.

Another group of polyepoxides comprises the solid polyepoxypolyethers obtained by reacting, preferably in the presence of an acid-acting compound, such as hydrofluoric acid, or of the aforedescribed halogen-containing epoxides, such as epichlorohydrin, with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by polyalkyl alcohol, polyvinyl alcohol, inositol, trimethylolpropane, bis(4 - hydroxycyclohexyl)dimethylmethane and the like so long as the resulting polyethers are friable solids.

Particularly preferred members of this group comprise the solid glycidyl polyethers of aliphatic polyhydric alcohols containing from 2 to 10 carbon atoms and having from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Polyepoxides having an epoxy equivalent weight of between 400 and 4,000 are preferred. Polyepoxides having an average molecular weight above 500, as for example, between about 800 and 3,1000 are especially preferred. Very suitable solid, friable polyepoxides are those formed from an epihalohydrin, and particularly epichlorohydrin, and a polyhydric compound, such as 2,2-bis(4-hydroxyphenyl)propane.

The polyepoxide which is used in the composition of the present invention may be entirely a solid grade of resin as are the polyethers D and E, noted above, or may be a blend of resins in which one of them is a liquid grade, such as, a polyepoxide having an epoxy equivalent weight of between 225 and 290 and an average molecular weight of between 450 and 500 as represented by Polyether A of U.S. Pat. 2,633,458. Thus, a suitable mixture of polyepoxides is a mixture containing between about 80 to 99% by weight of a solid polyepoxide derived from an epihalohydrin and 2,2′ - bis(4-hydrophenyl)propane having an epoxy equivalent weight of between 1,650 and 2,050 and an average molecular weight of between 2,700 and 3,100 (see, for example, U.S. Pat. 2,633,458, column 6, line 74 to column 7, line 9) and between about 1 and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 100° C., and more preferably, a resin having a melting point in the range of 120–160° C., and a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point of between 60 and 80° C. (Polyether D).

When a high epoxy functionality is desirable, a preferred epoxy resin is a mixture of isomers and homologues having the idealized structure of:

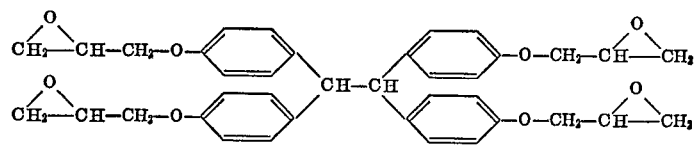

As noted hereinbefore, epoxy resins which are liquid or semi-liquid at ambient temperatures may be blended with solid resins; however, it is important that the ultimate blend be a solid, friable material. Consequently, solid epoxy resins or blends of solid epoxy resins are preferred.

Suitable (and preferred) epoxy curing agents include the carboxylic acids and anhydrides as well as the adducts thereof such as the benzophenone tetracarboxylic dianhydrides, the cyclic acid anhydrides such as trimelletic anhydride and pyromelletic anhydride, adducts of trimellitic anhydride and polyhydric alcohols.

The benzophenone tetracarboxylic dianhydrides which may be employed in the present invention have the following structural formula:

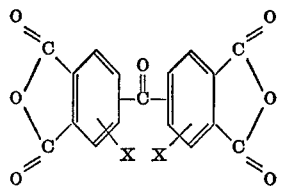

wherein X represents hydrogen, halogen, —NO$_2$, —COOH, —SO$_3$H or —NH$_2$ and may be the same or different radical.

Representative benzophenone tetracarboxylic dianhydrides include, among others, 3,3',4,4'-benzophenone tetracarboxylic dianhydride; 2 - bromo - 3,3',4,4'-benzophenone tetracarboxylic dianhydride; 2-carboxy-2'-sulfo-3,3',4,4'-benzophenone tetracarboxylic dianhydride; 2-amino - 2,3',4,4' - benzophenone tetracarboxylic dianhydride; and 5-nitro-3,3',4,4'-benzophenone tetracarboxylic dianhydride.

These dianhydrides may be prepared by oxidizing appropriate aryl compounds with nitric acid. In general, a nitric acid concentration of from about 5% to about 70% is employed and the amount may range from about 8.0 to about 17.0 on a molar ratio of 100% nitric acid relative to the aryl compound. The oxidation time can range from a few minutes to 2 or more days with from about 10 minutes to 2 hours generally employed. Temperatures of about 110° C. to about 350° C., with 150° C. to 250° C. being preferred, are employed. Since the oxidation reaction is preferably conducted in the liquid phase, pressures from about atmospheric to 500 pounds per square inch or higher are utilized. Upon completion of the oxidation reaction, the reaction mixture is allowed to cool, preferably down to about room temperature whereupon the reaction product precipitates out after from about 2 to 24 hours. These crystals of product are then separated from the liquid by any suitable means such as by filtration. The dried crystals are the dianhydrides utilized in the present compositions.

The aryl compounds which may be employed to produce the benzophenone tetracarboxylic dianhydrides of the present invention may be represented by the general structural formula:

$$\begin{array}{c} \text{Ar} \\ | \\ \text{H—C—R}_1 \\ | \\ \text{Ar} \end{array}$$

wherein Ar represents the same or different aryl radicals containing one or more rings and wherein at least one is an aromatic ring attached directly to the carbon atom in said formula, such as phenyl, biphenyl, naphthyl, phenanthryl, anthryl, indyl, dihydronaphthyl and cyclohexylphenyl, said radicals carrying as nuclear substituents at least two radicals defined by R$_1$, said latter radicals being located at least two positions away from said carbon in the formula and R$_1$ is selected from the group consisting of primary, secondary and tertiary alkyls having from one to 16 carbon atoms, such as methyl ethyl, n-propyl, isopropyl, isobutyl, amyl, isoamyl, hexyl, isooctyl, decyl, tetradecyl, hexadecyl, and the like. The remaining positions on the aromatic rings can include radicals such as said diverse radicals defined hereinabove as well as alkyl groups having from one to 10 carbon atoms. It is critical in order to obtain the anhydrides useful in the present compositions that the nuclear substituents on the aromatic rings, defined above by R$_1$, be located at least two positions away from the carbon in the structural formula immediately above, otherwise the compounds produced will not be anhydrides but could be lactones.

Suitable aryl compounds which may be oxidized to produce dianhydride useful in the present compositions include, among others, 1,1-bis(3,4,3',4'-tetramethylphenyl)ethane,
1,1-bis(2,2'-dibromo-3,4,3',4'-tetramethylphenyl)ethane,
1-(3-methyl-4-ethylphenyl 1-(2'-nitro-3',4'-diethylphenyl) ethane,
1,1-bis(3,4,3',4'-tetramethyl-5-aminophenyl)ethane,
1,1-bis(3-ethyl-4-butylphenyl)isobutane,
1-(3,4-diethylphenyl) 1-(3',4'-diisopropylphenyl)ethane,
1,1-bis(3,4,3',4'-tetramethylphenanthryl)ethane,
1-(-methyl-4-isopropylnaphthyl) 1-(3',4'-diethylanthryl) ethane, etc.

The preferred aryl compound is di-ortho-xylylethane, which when oxidized with nitric acid at about 200° C. yields 3,3',4,4'-benzophenone tetracarboxylic dianhydride.

Suitable cyclic acid anhydrides include, among others, pyromellitic dianhydride, Nadic® dianhydride, benzene/maleic dianhydride, cyclopentane dianhydride and styrene maleic dianhydride.

Particularly preferred are the cyclic anhydrides having at least one cyclic anhydride group, i.e.,

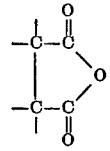

and a free carboxylic group, which is not more than 3 carbon atoms removed from the anhydride group. These anhydride compounds may be aliphatic, cycloaliphatic, or aromatic and may be saturated or unsaturated. Examples of these compounds include, among others, trimellitic anhydride, 1,2,3-(6-methyl-4-cyclohexane)tricarboxylic 1,2-anhydride, 1,2,4-butane tricarboxylic 1,2-anhydride, 1,2,3-pentane tricarboxylic 1,2-anhydride, 1,2,4-hexane tricarboxylic 1,2-anhydride, and 1,2,5-(3-chloroheptane)tricarboxylic 1,2-anhydride. Other examples include the half esters, and amides of pyromellitic anhydride, such as the monobutyl ester:

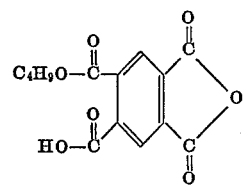

Suitable trimellitic anhydride adducts may be represented by the general structural formula:

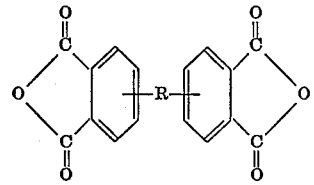

wherein R represents a hydrocarbon radical, preferably having from 2 to 12 carbon atoms, and wherein the aromatic nuclei may be substituted with one or more halogen atoms and/or one or more hydrocarboxyl groups. Especially good results are obtained when the adduct is an adduct of trimellitic anhydride and a polyhydric alcohol, preferably a glycol, such as ethylene glycol.

Thus, an especially preferred trimellitic anhydride-ethylene glycol adduct is represented by the formula:

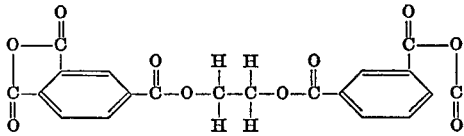

This and other trimellitic anhydride adducts may be prepared by any well-known techniques, such as by an acidolysis exchange reaction between trimellitic anhydride and a glycol diester.

Thus, a very suitable adduct may be prepared by reacting 2 moles of trimellitic anhydride with 1 mole of ethylene glycol diester (diacetic acid ester of ethylene glycol).

Additional solid curing agents include the phenolic resins (resole and novolac resins), urea-formaldehyde resins, melamine-formaldehyde resins and phenol-formaldehyde resins.

Other conventional epoxy curing agents such as the amidopolyamines prepared by reacting a monobasic carboxylic acid of up to 20 carbon atoms and an aliphatic polyamine are generally unsuitable in the present process since they range from viscous liquids to tough, non-friable, hard-to-grind solids. Also, most of the conventional amine curing agents, such as diethylene triamine, are either liquids or, if solid, tend to prematurely cross-link the polyepoxide, or are soluble in the hydrocarbon solvents.

For the above reasons, amino-derived curing agents are generally unsuitable for use in the present process.

Still other curing agents include dicyandiamide, acrylamides, imidazoles, hydrazides, guanidines, thioureas, sulfonamides, blocked isocyanates and boron trifluoride-amine adducts.

Suitable epoxy curing accelerators (catalysts) include the stannous salts of monocarboxylic acids and the organic phosphines or derivates thereof.

Stannous salts which are especially suitable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from about 0.1 to 5 parts per one hundred parts of polyepoxide and preferably from about 0.5 to 5 parts per one hundred parts of polyepoxide.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihdyrocarbyl phosphines and monohydrocarbyl phospines, such as tricyclohexyl phosphine, triphenyl phosphine, trioctyl phosphine, tributyl phosphine, trixylyl phosphine, tridodecyl phosphine, cyclohexyl octyl phosphine and the like. Particularly preferred phosphines include the trialkyl, the tricycloalkyl, the tri(alkylcycloalkyl), and the triaryl and tri(alkaryl)phosphines and particularly those wherein each of the hydrocarbon radicals attached to the phosphorus atoms contains no more than 12 carbon atoms, and still more preferably no more than 8 carbon atoms, with a total number of carbon atoms preferably not being more than 30.

Of special importance, particularly because of their high degree of catalyst activity are the aromatic hydrocarbyl phosphines such as triphenylphosphine although the aliphatic phosphines such as tributylphosphines may also be utilized effectively.

These organic phosphine catalysts are preferably used in amounts from about 0.05 to 5 parts per one hundred parts of polyepoxide (phr.), although from about 0.5 to 2.0 phr. are usually employed.

In general, the reactants, i.e., polyepoxide, curing agents, catalysts and accelerators, must be insoluble in the medium used. As used herein, "insoluble" means that the particular compound is soluble to the extent of less than 1% by weight in the particular thinner employed.

The preferred phosphine derivatives include the organic phosphonium halides having the general formula:

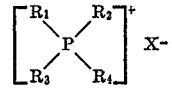

wherein $R_1$ is an organic radical, $R_2$, $R_3$ and $R_4$ is a hydrogen atom or an organic radical, preferably a hydrocarbon radical and more preferably an alkyl and/or aryl radical, and X is a halide, preferably chloride or bromide. Suitable organic phosphonium halides, include, among others, tetrabutyl phosphonium chloride, tetrabutyl phosphonium bromide, tetrabutyl phosphonium iodide, tetraphenyl phosphonium chloride, tetraphenyl phosphonium bromide, tetraphenyl phosphonium iodide, methyl tributyl phosphonium chloride, methyl tributyl phosphonium bromide, methyl tributyl phosphonium iodide, ethyl tributyl phosphonium chloride, ethyl tributyl phosphonium bromide, ethyl tributyl phosphonium iodide, butyl triphenyl phosphonium chloride, butyl triphenyl phosphonium bromide, butyl triphenyl phosphonium iodide, methyl triphenyl phosphonium chloride, methyl triphenyl phosphonium bromide, ethyl triphenyl phosphonium chloride, ethyl triphenyl phosphonium bromide, n-butyl triphenyl phosphonium chloride, n-butyl triphenyl phosphonium iodide, ethyl triphenyl phosphonium chloride, propyl tributyl phosphonium iodide, and methyl triphenyl phosphonium chloride.

Suitable fillers and pigments which may be employed as desired, include, among many others, aluminum powder, mica, bentonites, clays, synthetic resins and elastomers, ignited $Al_2O_3$, short-fiber asbestos, wood flour, carbon black, silica, zinc dust, talc and the like. A large number of fillers and pigments are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranged from about 10 to about 60 phr.

In general, all liquid media which are non-solvents for the present ingredients of the composition are suitable for use in the instant process.

For some applications, water is a very effective liquid medium (herein sometimes referred to as thinner).

For other applications, suitable media include the aliphatic hydrocarbons having a boiling point below about 460° F. It will be appreciated that mixtures of such hydrocarbons are commercially available containing a wide range of components and boiling ranges. The term "aliphatic hydrocarbon" as used in this specification and claims is meant a hydrocarbon solution or fraction containing less than 30% by volume, and preferably less than 20% by volume, of aromatics and at least 70% by volume, and preferably greater than 80% by volume paraffins. The term "paraffins" includes the normal, iso- or branched and cyclic aliphatic hydrocarbons being substantially saturated, i.e., containing essentially no unsaturation.

Especially preferred aliphatic hydrocarbons are the so-called mineral spirits which have a boiling range from about 275° F. to about 425° F., and more preferably between about 315° F. and 395° F. These mineral spirits preferably contain less than 20% by volume of aromatics, which aromatics contain from about 8 to 12 carbon atoms and comprise the alkyl mono-and polysubstituted benzenes such as diethyl benzene, triethyl benzene, propyl benzene, butyl benzene, tetramethyl benzene, etc. Preferred mineral spirits therefore contain at least 80% by volume of paraffins. These paraffins include the normal paraffins (straight-chain), iso-paraffins (branched-chain) and cyclo-paraffins (naphthenes). Generally, more than 75% by volume of the paraffins comprise the iso-paraffins and cyclo-paraffins containing from about 10 to 14 carbon atoms.

Other suitable high paraffinc (low aromatic) hydrocarbons include the commercially available solvents sold under the trade designation of Shell Sols®.

The present compositions are simply prepared by charging the components in a pebble mill with the grinding media and grinding for a period of time sufficient to disperse the particles in the liquid medium. In general, the grinding time will range from about 5 hours to 50 hours or more although grinding times of from 15 to 35 hours are generally employed.

The preferred grinding apparatus is the so-called pebble mill and the preferred grinding media are the so-called high density media.

The high density grinding media may be spherical or cylindrical in shape with cylindrical media being preferred. The spherical media may range from about ¼ inch in diameter to 2 or more inches in diameter with a preferred diameter of from about ½ to 1½ inches in diameter. In general, the cylindrical media may range from about ½ inch in diameter to 2 or more inches in diameter with the preferred diameter being in the range of from ¾ inch to 1½ inches in diameter. The ratio of height to diameter of the cylinders may range from about 0.5:1 to about 3:1 with a 1:1 ratio being preferred. The term "high density" as used herein means a density which is at least 25% greater than porcelain and preferably at least 40% greater than porcelain. The density of the grinding media may be expressed in terms of specific gravity based on water as 1.0. Thus, the term "high density" as used herein means that the grinding media has a specific gravity of at least 2.75 and preferably greater than 3.5. The grinding media may be metallic, semi-metallic or non-metallic. In general, non-metallic media are preferred although metallic grinding media such as steel, may be used in applications where metallic contamination is not a limiting consideration.

The volume ratio of media to the solid formation components may vary through a wide range with a ratio of from about 1:1 to about 5:1 being usually employed. Very good results are obtained when the weight ratio of media to solid components is from about 1:1 to about 10:1 with a ratio of about 5:1 to 10:1 being preferred.

While the polyepoxide may be added to the pebble mill in flake or lump form, i.e., without pregrinding, it is generally preferred to pregrind the polyepoxide to approximately 20 mesh.

The proportions of polyepoxide, curing agents, catalysts, liquid media, pigments, fillers and other additives will vary within wide ranges.

The polyepoxide and curing agent are generally employed in a chemical equivalent ratio of from 1.5:1.0 to 1.0 to 1.5 with from 1.25:1.0 to 1.0 to 1.25 being preferred. For many applications, it is desirable to employ near stoichiometrical amounts of curing agent and polyepoxide, i.e., less than about a 10% excess of either reactant.

In general, the epoxy catalyst is employed in amounts from about 0.05 to 5 parts per one hundred-parts by weight of polyepoxide (phr.) with from about 0.5 to 3 phr. being preferred.

The amounts of liquid media (thinner) used will vary somewhat depending upon the particular thinner to be employed and the particular end use; however, it is generally advantageous to use an amount to produce a total non-volatile content of at least 25% by volume and preferably at least 35% by volume. For most paint applications, the total non-volatiles will range from about 35% to about 65% by volume.

When water is used in lieu of the hydrocarbon media, a very high degree of thixotropy may be encountered in some systems. In such cases, the fluidity of the dispersion may be enhanced if thixotropic agents and/or dispersing agents are additionally employed such as methyl cellulose, castor oil derivatives, silicones, and the like.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

The use of dispersing or emulsifying agents are not required in practice of the present process; however, such agents are usually employed for convenience. Accordingly, although all the following illustrative examples employ a dispersing agent, it is understood that such use is typical only and that the present process should not be so limited.

EXAMPLE I 1600 grams of the following components were charged into a 1½ gallon mill containing 5500 grams of cylindrical high density grinding media and ground for 20 hours:

| Compound: | Percent weight |
|---|---|
| Polyepoxide X [a solid glycidyl polyether of 2,2-bis-(4-hydroxyphenyl)propane having a melting point of 98° C., an average molecular weight of 1400 and an epoxide value of 0.103 eq./100 g.] | 41.5 |
| 3,3',4,4'-benzophenone tetracarboxylic dianhydride | 7.1 |
| Stannous octoate | 1.2 |
| Span 80 (sorbitan monoleate) | 2.0 |
| Mineral Spirits 35–40KB [1] | 48.2 |
| | 100.0 |

[1] An aliphatic hydrocarbon cut having the following physical properties:

| | |
|---|---|
| Boiling range (° F.) | 317–391 |
| Specific gravity 60/60° F. | 0.784 |
| Kauri butanol value | 37.5 |
| Composition percent: | |
| Paraffins | 55 |
| Naphthenes | 29 |
| Aromatics | 16 |

The product after 20 hours of grinding was a cream-colored fluid having a viscosity of 100 cps. at 51% non-volatile and an average particle size distribution of:

| | Percent by weight |
|---|---|
| 10–20 microns | 2.2 |
| 5–10 microns | 20.5 |
| 2.5–5 microns | 18.1 |
| 2.5–0 microns | 59.2 |
| | 100.0 |

Films were prepared from this dispersion by drawing down on bonderized steel plates. The films, 1.0 to 1.5 mil thick, were allowed to air dry 10 to 20 minutes before baking. The films were then baked at various schedules and then tested for flexibility and solvent resistance (methyl ethyl ketone—MEK). A comparison of the curing properties of the instant system was then made with (A) a phenolic cured epoxy resin coating system and (B) a urea-formaldehyde cured epoxy resin coating system, both of these systems being of the conventional solution type. The phenolic-cured and the urea formaldehyde-cured systems are as follows:

| Component: | Percent weight |
|---|---|
| Polyepoxide X | 43.2 |
| Trimellitic anhydride | 4.4 |
| Triphenyl phosphine | 0.5 |
| Non-ionic dispersing agent | 2.0 |
| Trixotropic agent (polymerized castor oil derivative) | 0.3 |
| Mineral Spirits 35–40 KB | 49.6 |
| | 100.0 |

TABLE I

| | Bake schedules | | | | | | | | | |
|---|---|---|---|---|---|---|---|---|---|---|
| | 350° F. | | | | | | 400° F. | | | |
| Composition | 2 min. | 3 min. | 4 min. | 5 min. | 10 min. | 20 min. | 2 min. | 3 min. | 4 min. | 5 min. |
| Polyepoxide X/BPDA:[1] | | | | | | | | | | |
|   MEK resistence, min. | <5 | <5 | <5 | >60 | | | <5 | >60 | | |
|   Flexibility (Zuhr mandrel) | P ⅛″ | P ⅛″ | P ″⅛ | P ⅛″ | | | P⅛″ | P ⅛″ | | |
| Phenolic-cured:[2] | | | | | | | | | | |
|   MEK resistance, min. | <5 | <5 | <5 | 25 | 15 | >60 | <5 | <5 | 10 | >60 |
|   Flexibility (Zuhr mandrel) | P ⅛″ | P ⅛″ | P ⅛″ | P ⅛″ | P ⅛″ | P ⅛″ | P ⅛″ | P ⅛″ | P ⅛″ | P⅛″ |
| Urea-formaldehyde cured:[2] | | | | | | | | | | |
|   MEK resistance, min. | <5 | <5 | <5 | >60 | | | <5 | >60 | | |
|   Flexibility (Zuhr mandrel) | F ¼″ | P ⅛″ | P ⅛″ | P ⅛″ | | | F ½″ | >P ⅛″ | | |

[1] Dispersion system.    [2] Conventional solvent system.

(A) Phenolic-cured epoxy resin system

| | |
|---|---|
| Polyepoxide Y (a solid glycidyl polyether of 2,2-bis-(4-hydroxyphenyl)propane having a melting point of 125–135° C., an average molecular weight of 2900, and an epoxide value of 0.06 eq./100 g. | 29.23 |
| Cellosolve® acetate ($CH_3COOCH_2CH_2OC_2H_5$) | 27.17 |
| Toluene | 27.17 |
| Flow control agent (a pure silicone resin, solids content—60% in xylene, sp. gr. 1.06, viscosity 5–30 cp., color (Gardner)—0 to 3 | 0.67 |
| Cross-linking agent (a dark brown liquid mixture of the allyl ethers of mono-, di- and triphenols, viscosity, 2000–4000 cp.—density 9.7 lbs./gal.) | 9.76 |
| Phosphoric acid solution (85% phosphoric in n-butanol—10% solids) | 6.00 |
| | 100.00 |

(B) Urea-formaldehyde cured epoxy resin system

| | |
|---|---|
| Polyepoxide Y | 28.00 |
| Cellosolve® acetate | 26.00 |
| Toluene | 26.00 |
| Beckamine P196 (a urea-formaldehyde resin; 60% non-volatiles (volatiles are betanol-ethanol); viscosity (Gardner-Holdt) K to M; color (Gardner)—2 max.; Acid No. 2 to 5; density 8.6 lbs./gal. | 20.00 |
| | 100.00 |

The MEK resistance was determined as follows:

A steel panel coated with the system under test is immersed in MEK and observed periodically for softening. The results are reported at the immersion interval which softens the coating at the point where it can be cut with the fingernail.

The flexibility (Zuhr mandrel) was determined as follows:

The bonderized steel panel is bent over a conical mandrel ranging in diameter from ⅛ inch at the narrow end to 1½ inch at the wide end. The results are reported as the diameter at which cracks occur in the film. If no cracks are observed the result is reported as P (pass) ⅛ inch.

The comparative results are tabulated in Table I.

EXAMPLE II

The procedure of Example I was substantially followed wherein the following formulation was used:

The test results obtained from 1 mil films cured 10 minutes at 325° F. are as follows:

| | |
|---|---|
| Flexibility, Zuhr mandrel | Pass ⅛″. |
| Impact resistance | 100 inch pounds. |
| MEK resistance | 5–10 minutes. |

EXAMPLE III

The procedure of Example I was substantially followed wherein the following formulation was used:

| | |
|---|---|
| Polyepoxide Y | 42.6 |
| Cymel 300 (hexamethylmethoxy melamine) | 6.1 |
| Nonionic surface active agent | 2.0 |
| Thixotropic agent (polymerized castor oil derivative) | 0.2 |
| p-Toluene sulfonic acid (20% in isopropanol) | 0.4 |
| Shell Sol 360 [1] | 48.7 |
| | 100.00 |

[1] Properties:
| | |
|---|---|
| Boiling range (° F) | 316–349 |
| Specific gravity, 60/60° F. | 0.769 |
| Kauri butanol value | 33.3 |
| Composition (percent): | |
|   Paraffins | 57 |
|   Naphthenes | 39 |
|   Aromatics | 4 |

The following properties were obtained from films (1 mil thick) cured 10 min. at 325° F.:

| | |
|---|---|
| Flexibility, Zuhr mandrel | Pass ⅜″. |
| Impact resistance | 2 in./lb. |
| MEK resistance | >60 min. |

EXAMPLE IV

The procedure of Example I was substantially followed wherein the following formulation was used:

Mill charge composition:

| | |
|---|---|
| Polyepoxide Y | 23.9 |
| Varcum 5416 (heat hardening phenol-formaldehyde resin, softening range (ring and ball) 70–80° C.), Gardner color 10–16, sp. gr. 1.23 | 15.9 |
| Triton X–45 (Non-ionic wetting agent, Polyoxyethylene ether of octyl phenol) | 0.3 |
| Shell Sol 360 | 59.9 |
| | 100.00 |

Properties of 1 mil films, cured 10 min. at 400° F.:
    Flexibility, Zuhr mandrel_____ Pass 1/8".
    Impact resistance_____ 160 in./lb.
    MEK resistance_____ 15 min.

EXAMPLE V

The procedure of Example I was substantially followed wherein the following formulation was used:

Mill charge composition:
    Polyepoxide Y_____ 22.6
    Varcum 5416_____ 15.0
    Anionic surfactant_____ 1.9
    Methocel HG (4.5% methyl cellulose in water) _____ 4.1
    Water _____ 56.4
                                          ─────
                                          100.00

Properties of 1 mil films, cured 10 min. at 400° F.:
    Flexibility, Zuhr mandrel_____ Pass 1/8".
    Impact resistance_____ 100 in./lb.
    MEK resistance_____ 15 min.

EXAMPLE VI

The procedure of Example I was substantially followed wherein the following formulation was used:

Mill charge composition:
    Polyepoxide X_____ 26.4
    A phenol-blocked isocyanate adduct prepared by reacting 3 moles of toluene diisocyanate with 1 mole of trimethyl propane and blocking with 3 moles of phenol—percent NCO—11.5 to 13.5_____ 21.3
    Non-ionic surfactant_____ 2.0
    Thixotropic agent (polymerized castor oil derivative) _____ 0.3
    Shell Sol 360_____ 50.0
                                          ─────
                                          100.0

The following properties were obtained from films (1 mil thick) cured 20 min. at 400° F.:

Flexibility, Zuhr mandrel _____ Pass 1/8".
Impact resistance _____ 30 in./lb.
MEK resistance _____ 15–20 min.

EXAMPLE VII

The procedure of Example I was substantially followed wherein the following formulation was used:

Mill charge composition:
    Polyepoxide X _____ 44.3
    BF₃ monoethylamine adduct _____ 3.4
    Non-ionic surfactant _____ 2.0
    Thixotropic agent (polymerized castor oil derivative) _____ 0.3
    Shell Sol 360 _____ 50.0
                                          ─────
                                          100.00

The following properties were obtained from films (1 ml. thick) cured 20 min. at 400° F.:

Flexibility, Zuhr mandrel _____ Pass 1/8".
Impact resistance _____ 20 in./lb.
MEK resistance _____ 20–25 min.

EXAMPLE VIII

The procedure of Example I was substantially followed wherein the following formulation was used:

Mill charge composition:
    Polyepoxide X _____ 44.3
    Dicyandiamide _____ 3.4
    Non-ionic surfactant _____ 2.0
    Thixotropic agent (polymerized castor oil derivative) _____ 0.3
    Shell Sol 360 _____ 50.0
                                          ─────
                                          100.0

The following properties were obtained from films (1 mil thick) cured 20 min. at 400° F.:

Flexibility _____ Pass 1/8".
Impact resistance _____ 5 in./lb.
MIKB resistance (methyl isobutyl ketone) __ 20–25 min.

I claim as my invention:
1. A process for preparing a one-package, thermosetting coating composition which can be applied by conventional liquid application techniques which comprises grinding and dispersing
   (A) a composition comprising
       (1) a solid, friable polyepoxide containing at least one vic-epoxy group,
       (2) a solid, friable epoxy curing agent,
       (3) an epoxy curing accelerator,
       (4) a dispersing agent in
   (B) a hydrocarbon medium having a boiling point below about 460° F. and containing less than 30% by volume of aromatics and in which the components are soluble to less than 1% by weight.
2. A process as in claim 1 wherein the polyepoxide is a glycidyl polyether of a polyhydric phenol or polyhydric alcohol.
3. A process as in claim 1 wherein the polyepoxide is a glycidyl polyether of 2,2-bis(4-hydroxyphenyl)propane.
4. A process as in claim 1 wherein the epoxy curing agent is a polycarboxylic acid anhydride.
5. A process as in claim 4 wherein the epoxy curing agent is a benzophenone tetracarboxylic dianhydride.
6. A process as in claim 4 wherein the epoxy curing agent is trimellitic anhydride.
7. A process as in claim 1 wherein the epoxy curing agent is a heat hardening phenol-formaldehyde resin.
8. A process as in claim 1 wherein the epoxy curing agent is a heat reactive aminoplast resin.
9. A process as in claim 1 wherein the epoxy curing agent is a phenol-blocked isocyanate adduct.
10. A process as in claim 1 wherein the epoxy curing agent is a boron trifluoride-amine adduct.
11. A process as in claim 1 wherein the epoxy curing agent is dicyandiamide.
12. A process as in claim 1 wherein the epoxy curing accelerator is a stannous salt of a fatty acid containing from 5 to 20 carbon atoms in the molecule.
13. A process as in claim 12 wherein the stannous salt is stannous octoate.
14. A process as in claim 1 wherein the epoxy curing accelerator is an organic phosphine or a phosphonium halide.
15. A process as in claim 14 wherein the organic phosphine is triphenyl phosphine.
16. A process as in claim 14 wherein the phosphonium halide is ethyl triphenyl phosphonium iodide.
17. A process as in claim 1 wherein the chemical equivalent of polyepoxide to curing agent is from about 1.0:1.50 to 1.50:1.0.
18. A process as in claim 1 wherein the epoxy curing accelerator is employed in amounts from 0.5 to 5 parts per 100 parts by weight of the polyepoxide.
19. A process as in claim 1 wherein the hydrocarbon medium is employed in an amount to produce a total nonvolatile content between 35% and 65% by volume.

20. A process as in claim 1 wherein the grinding is performed in a pebble mill using high density cylindrical grinding media.

References Cited
UNITED STATES PATENTS

| | | | |
|---|---|---|---|
| 3,275,587 | 9/1966 | Weller et al. | 260—29.2 |
| 3,362,922 | 1/1968 | Manasia et al. | 260—18 |
| 3,374,193 | 3/1968 | Tsatsos et al. | 260—18 |
| 3,419,510 | 12/1968 | Hudak | 260—18 |
| 3,420,791 | 1/1969 | Gurgiolo et al. | 260—33.6 |
| 3,464,854 | 9/1969 | Bolger | 117—160 |
| 3,470,110 | 9/1969 | Renner | 260—2 |
| 3,474,056 | 10/1969 | Schneider et al. | 260—18 |
| 3,549,582 | 12/1970 | Payne et al. | 260—37 |
| 3,477,979 | 11/1969 | Hillyer | 260—29.2 |
| 3,484,398 | 12/1969 | Childs | 260—18 |
| 3,506,598 | 4/1970 | Groff et al. | 260—18 |

DONALD E. CZAJA, Primary Examiner

R. W. GRIFFIN, Assistant Examiner

U.S. Cl. X.R.

117—132 BE, 161 ZB; 260—18 EP, 19 EP, 29,2 EP, 29.2 TN, 29.3, 29.4 R, 33.6 EP